US007219600B1

(12) United States Patent
Haven et al.

(10) Patent No.: US 7,219,600 B1
(45) Date of Patent: May 22, 2007

(54) INFUSER TEA POT

(75) Inventors: Kenneth Haven, Fremont, CA (US);
Brian Richardson, Morgan Hill, CA (US); Daniel Blaugrund, Palo Alto, CA (US); Charles Richard Lewis, Jr., Palo Alto, CA (US); Maria Uspenski, Boulder, CO (US); Karen A. des Jardins, Encinitas, CA (US)

(73) Assignee: Tea Spot, Inc., Boulder, CO (US)

( * ) Notice: Subject to any disclaimer, the term of this patent is extended or adjusted under 35 U.S.C. 154(b) by 262 days.

(21) Appl. No.: 10/799,425

(22) Filed: Mar. 12, 2004

(51) Int. Cl.
*A47J 31/06* (2006.01)
(52) U.S. Cl. ............................. 99/318; 99/322; 99/323
(58) Field of Classification Search ................. 99/318, 99/319, 320, 322, 323, 306, 307, 279
See application file for complete search history.

(56) References Cited

U.S. PATENT DOCUMENTS

| 2,065,149 | A | 12/1936 | Newman |
| 6,318,244 | B1 | 11/2001 | Justus |
| 6,431,056 | B1 | 8/2002 | Fritschi |

*Primary Examiner*—Reginald L. Alexander
(74) *Attorney, Agent, or Firm*—Christopher Braddock

(57) ABSTRACT

An automatic system for removing tea from a teapot is disclosed. The present invention incorporates the use of a timing mechanism, a release mechanism and an infuser mechanism to automatically remove the tea from hot water. The timing mechanism is user set and controls the length of time the tea is steeped in hot water. The infuser mechanism comprises a filter element that holds the tea in contact with the hot water and a counterbalance that rotates the filter element out of the water when released and the release mechanism that releases the infuser mechanism when the time has expired.

14 Claims, 6 Drawing Sheets

Counter Waht

Counter Waht

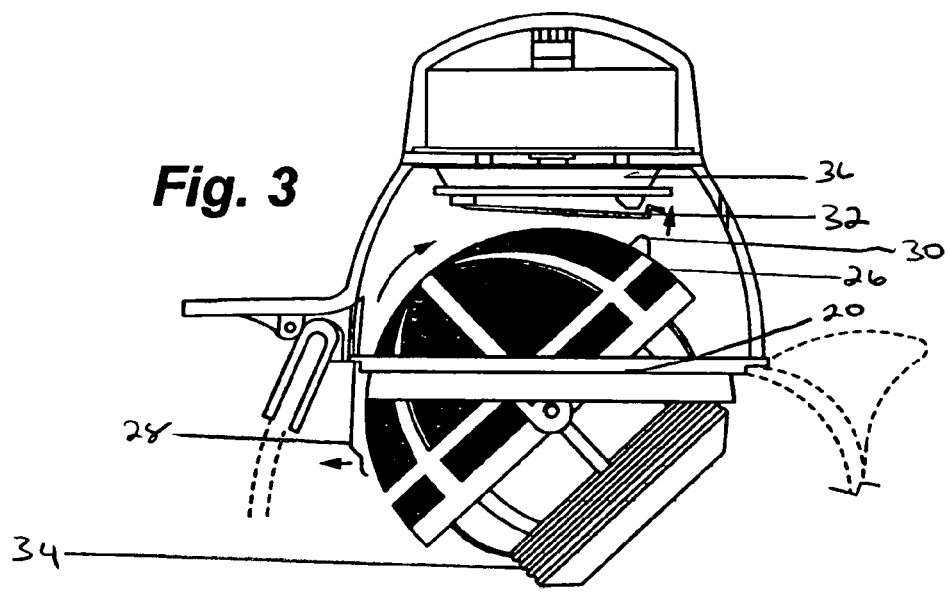
Fig. 3
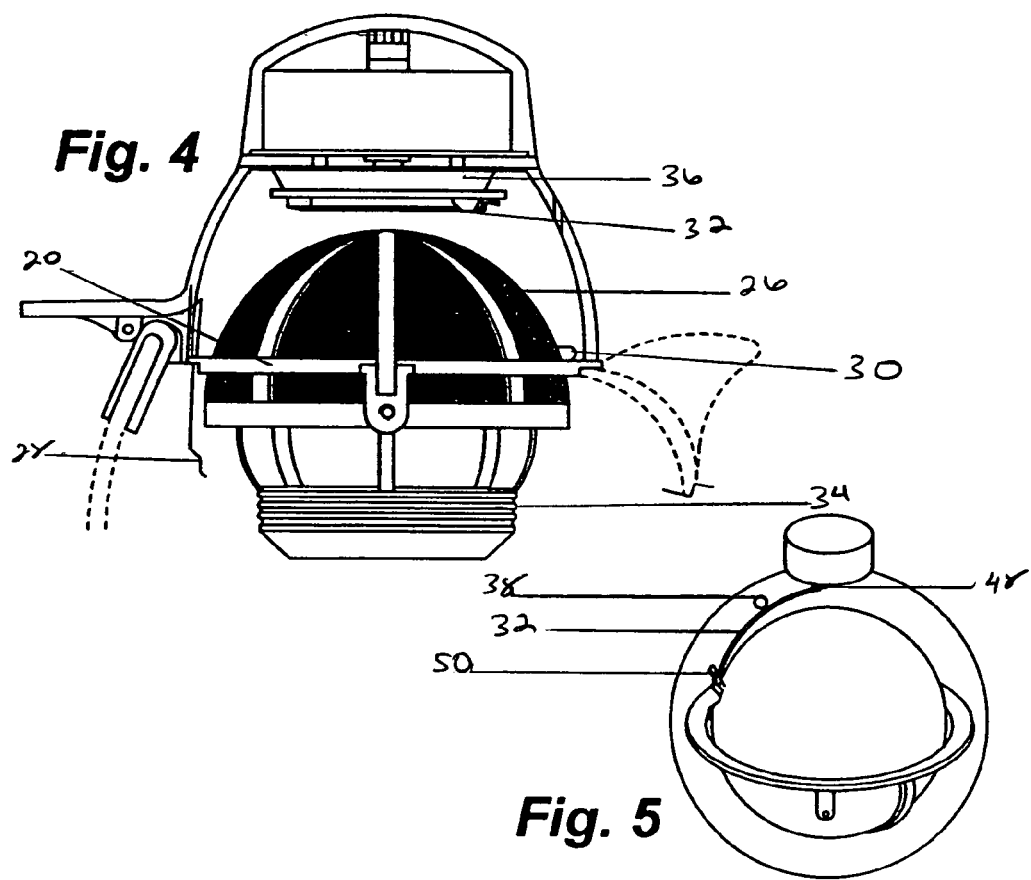
Fig. 4
Fig. 5

Float

*Spring Loaded*

Spring Loaded

INFUSER TEA POT

CROSS-REFERENCE TO RELATED APPLICATIONS

Not applicable

STATEMENTS REGARDING FEDERALLY SPONSORED RESEARCH OR DEVELOPMENT

Not applicable

BACKGROUND OF THE INVENTION

The present invention generally relates to the field of adding flavor to a liquid, and more particularly to a device that controls the steeping time for brewing tea. The strength and flavor tea imparts to a liquid is controlled, in part, by the length of time the tea is steeped in water. Failure to remove the tea in time may result in a disagreeable taste. Conventional teapots normally require intervention by the user to control the steepage time. The invention at hand, however, uses an infuser mechanism coupled with a timer mechanism and a release mechanism to automatically remove the tea from the water without intervention by the user.

SUMMARY OF THE INVENTION

A first aspect of the present invention generally relates to the release mechanism. The first preferred embodiment of this aspect generally relates to an infuser mechanism that is rotatably fixed around an axis. The infuser mechanism is comprised of a filter element and a counter balance. A detent supports the infuser mechanism so that the filter element remains in contact with the water. An actuator is operatively connected between the timing mechanism and the infuser mechanism. Once the timing mechanism finishes the count down, the actuator applies a one-time force to the rim of the infuser mechanism, overcoming the support provided by the detent. The infuser mechanism then rotates and the filter element is rotated completely out of the water.

A second embodiment of this aspect generally relates to an infuser mechanism that is rotatably fixed around an axis. The infuser mechanism is comprised of a filter element and a counter balance. A latch supports the infuser mechanism so that the filter element remains in contact with the water. An actuator is operatively connected between the timer mechanism and the latch and is constrained at a pivot point. As the timer counts down, a downward force is applied to the end of the actuator nearest the timer mechanism. The actuator then pivots around the pivot point such that the opposing actuator end applies an outward force on the latch and releases the infuser mechanism. The infuser mechanism then rotates around the axis such that the filter element is completely out of the water.

A second aspect of the present invention generally relates to the infuser mechanism. In the first preferred embodiment of this second aspect an infuser mechanism, comprised of a filter element and a counter weight, is operatively connected to the teapot housing and is rotatably fixed around an axis. If left unsupported, the infuser mechanism would rotate around the axis and the filter element would come to rest out of the water. Tea is placed within the filter element and a mechanism for releasing the filter element as described in the first aspect of the invention is then coupled with this embodiment to allow for the filter element to be removed from the water without intervention by the user. In this embodiment the counter weight must weigh more than the combined weight of the wet tealeaves in the filter element and the filter element.

A second embodiment of the second aspect of the invention generally includes an infuser mechanism comprised of a filter element and a torsion spring. In this embodiment, the torsion spring is operatively connected between the teapot housing and the filter element such that the filter element is rotatably fixed around an axis. If left unsupported, the infuser mechanism would rotate around the axis and the filter element would come to rest out of the water. Tea is placed within the filter element and a mechanism for releasing the filter element as described in the first aspect of the invention is then coupled with this embodiment to allow for the filter element to be removed from the water without intervention by the user. In this embodiment, the torsion spring moment must be greater than the combined weight of the wet tea in the filter element and the weight of the filter element.

A third embodiment of the second aspect of the invention generally includes an infuser mechanism comprised of a filter element and a flotation device. In this embodiment of the invention an infuser mechanism, comprised of a filter element and a flotation device, is operatively connected to the teapot housing and is rotatably fixed around an axis. If left unsupported, the infuser mechanism would rotate around the axis and the filter element would come to rest out of the water. Tea is placed within the filter element and a mechanism for releasing the filter element as described in the first aspect of the invention is then coupled with this embodiment to allow for the filter element to be removed from the water without intervention by the user. In this embodiment, the flotation device moment must be greater than the combined weight of the wet tea in the filter element and the flotation device.

There has thus been outlined features of the invention in order that the detailed description thereof that follows may be better understood, and in order that the present contribution to the art may be better appreciated. There are, of course, additional features of the invention that will form the subject matter of the claims appended hereto. In this respect, before explaining at least one embodiment of the invention in detail, it is to be understood that the invention is not limited in its application to the details of construction and to the arrangements of the components set forth above or in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings illustrate a preferred embodiment of the present invention according to the best mode presently devised for practical application of the principles thereof, and in which:

FIG. 3 is a rotational view of the counter weight embodiment of the invention of FIG. 2, where the filter element is in rotation;

FIG. 4 is a side view of the counter weight embodiment of the invention of FIG. 3, where the filter element has rotated 180 degrees;

FIG. 5 is an isometric view of the latch release mechanism;

DETAILED DESCRIPTION OF THE INVENTION

Figure 1:
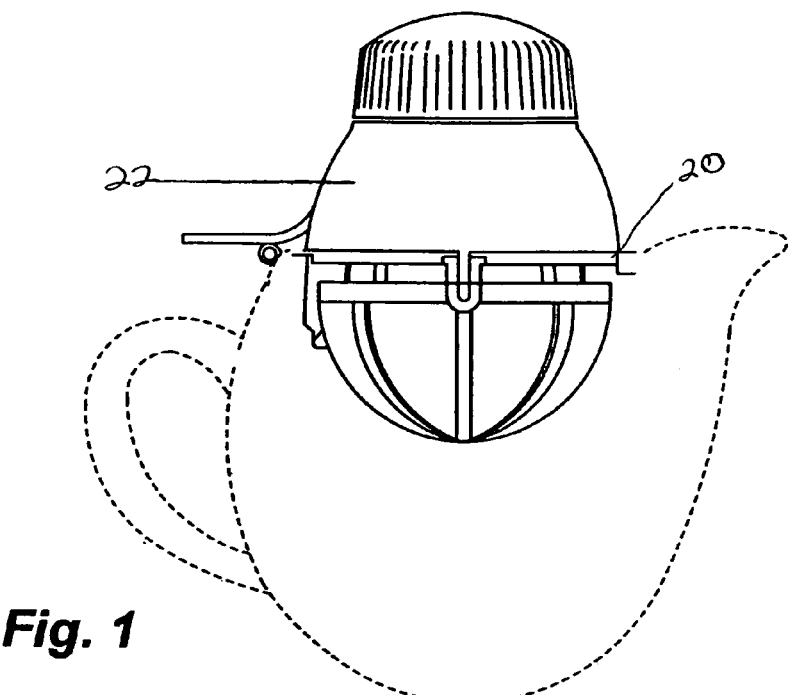
FIG. 1 is a side view of a teapot.

In the drawings like reference numerals throughout the various figures refer to the same item. Referring now to the drawings, FIGS. 1–4 depict of one of the preferred embodiments of the release mechanism coupled with an infuser mechanism of invention and shows a teapot housing 20 a lid 22 and an infuser mechanism 24. In this embodiment the infuser mechanism is comprised of a detent 28 a detent couple 30 a filter element 26 a counter weight 34 and an actuator 32. As is shown the actuator 34 operatively connects a timing mechanism 36 with the counter weight 34. The infuser mechanism 24 is rotatably connected to the teapot housing 20 such that it may rotate around an axis 25. The detent 28 supports the infuser mechanism 24 such that the filter element 26 in the down position while the counter weight 34 is in the up position It is important to note that if the infuser mechanism 24 is allowed to rotate naturally, the filter element 26 would be in the top position as is shown in FIG. 4. Thus, the detent 28 cooperates with the detent couple 30 to hold the filter element 26 in the down position.

In practice, tea is placed in the filter element and the timing mechanism 36 is set to the desired setting, when timer has finished the actuator 32 applies an one-time force to the counter weight 34 such that the infuser mechanism 24 is no longer stabilized by the detent 28 and the detent couple 30 and the infuser mechanism rotates to its natural position. Thus, in the final position, the filter element 26 is completely out of the water.

The timer mechanism may be any conventional timer mechanism such as a slider timer mechanism. For instance, if a conventional slider timer mechanism is utilized, as the timer is counting down a slider moves and stretches a return spring. Once the timer has finished, the slider is released and the return spring returns the slider to the start position. In the present invention, the actuator may be operatively connected to the slider such that when the slider is returned to the start position, the actuator contemporaneously moves forward and thereby applies a force to the counter weight, destabilizing the infuser mechanism.

Figure 2:
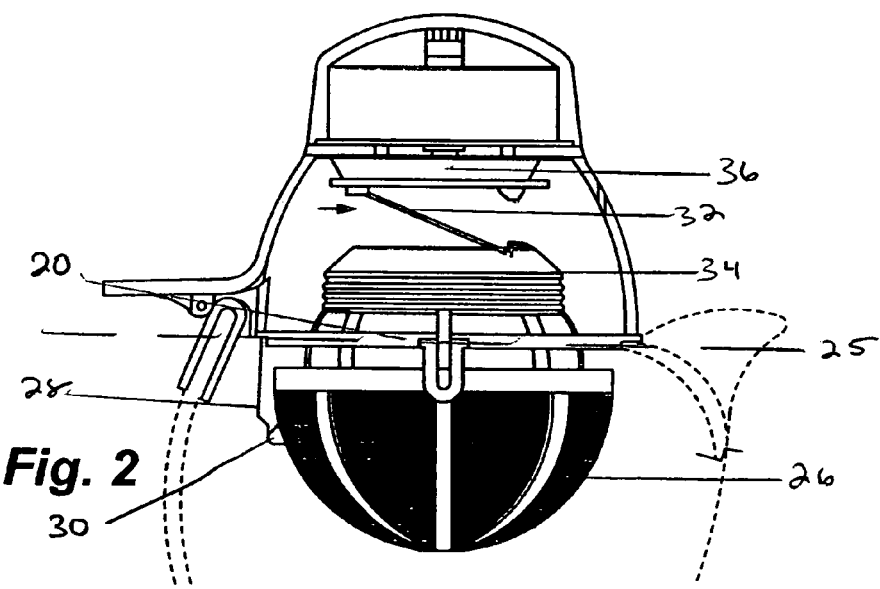
FIG. 2 is a side view of the counter weight embodiment utilizing the detent release mechanism of the present invention. In this figure the filter element is in the brew position.

When additional tea is required, the lid 22 is removed and the infuser mechanism 24 is reset such that the detent 28 cooperates with the detent couple 30 to stabilize the filter element 26 in the down position. Tea is then added to the filter element 26 and the timer mechanism 36 is set to the desired setting. It is not necessary that the actuator 32 remain in constant contact with the counter weight 34. What is essential is that when the timing mechanism has finished, the actuator 32 is operatively connected to the counter weight 34 such that a force great enough to destabilize the system is applied. Thus, the actuator 32 may be designed to apply an ever-increasing force, or may apply a one-time force. As is shown in FIG. 2, the actuator 32 applies a force that is designated by an arrow 33. Obviously, the arrangement of this invention may be modified such that the force may cause the infuser mechanism 24 to rotate either direction. Additionally, the invention may include a drip barrier, such that when the filter element 26 is in the final position, the drip barrier will prevent the filter element 26 from imparting additional flavor to the tea. As such, these modifications are considered within the scope of the present invention.

Figure 5A:
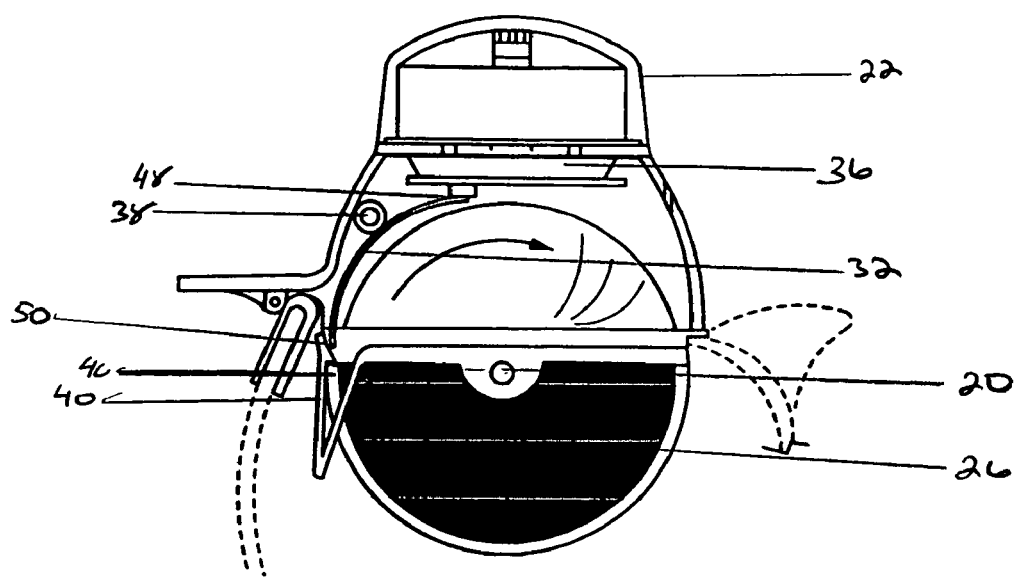
FIG. 5a is a side view of the float embodiment utilizing the latch release mechanism. In this figure the filter element is in the brew position.
Figure 6:
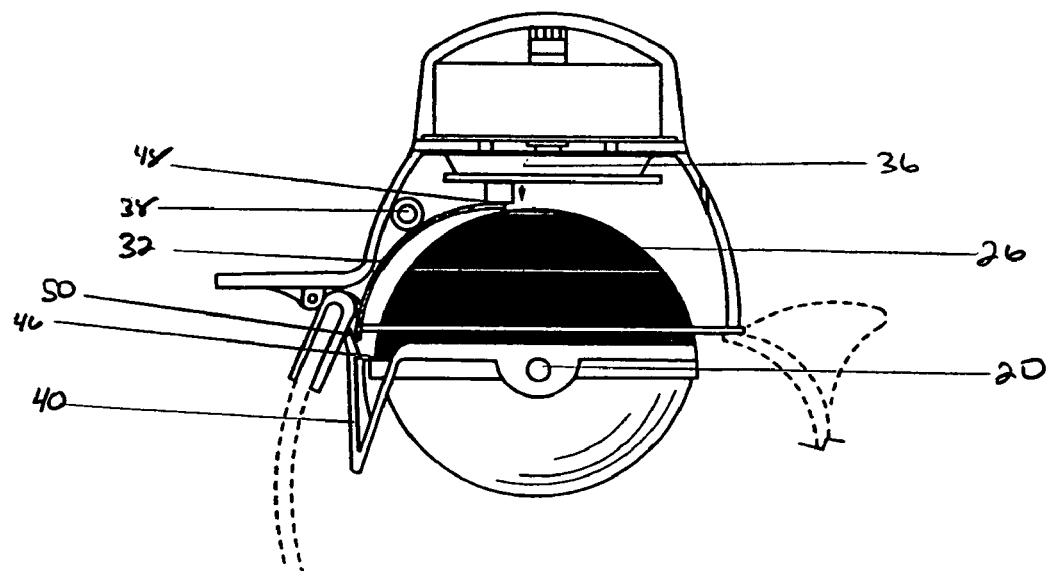
FIG. 6 is a side view of the float embodiment of the invention of FIG. 5a, where the filter element has been rotated 180 degrees.
Figure 7:
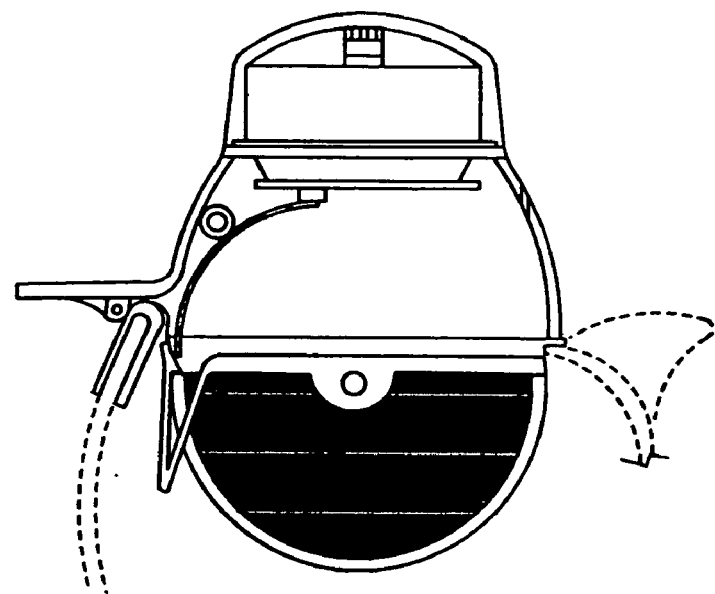
FIG. 7 out
Figure 8:
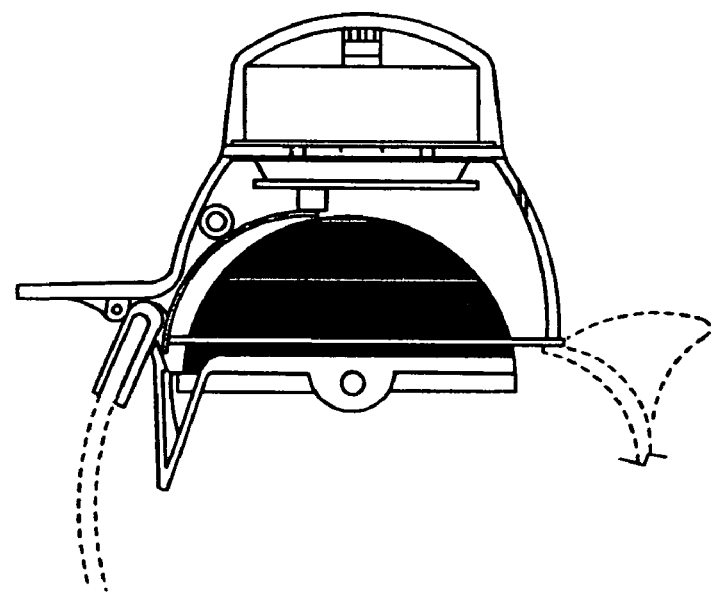
FIG. 8 out
Figure 9:
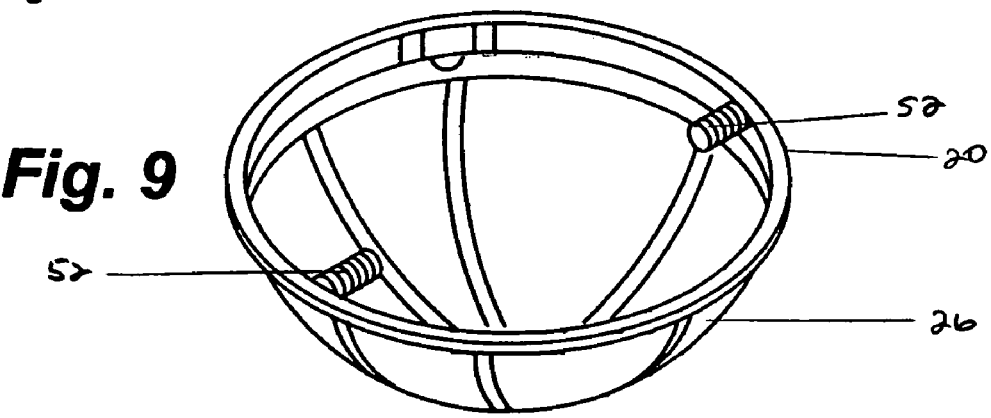
FIG. 9 is a isometric view of the torsion spring embodiment of the invention.
Figure 10:
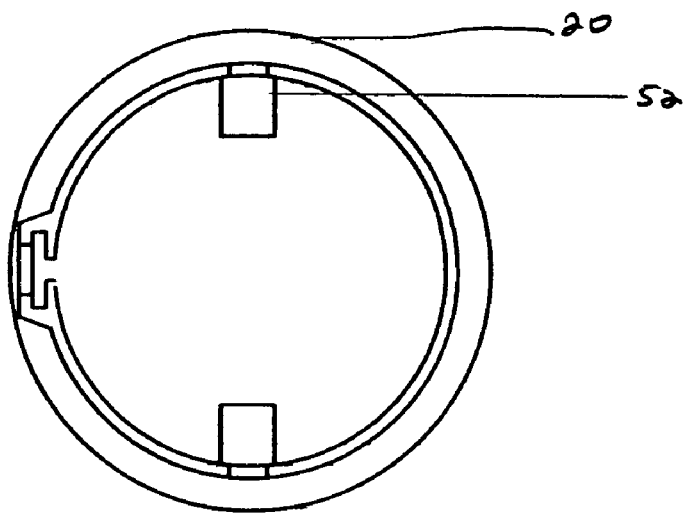
FIG. 10 is a top view of the torsion spring embodiment.
Figure 11:
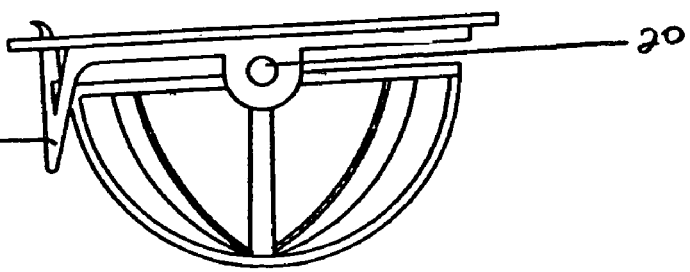
FIG. 11 is a side view of the latch release mechanism.
Figure 14:
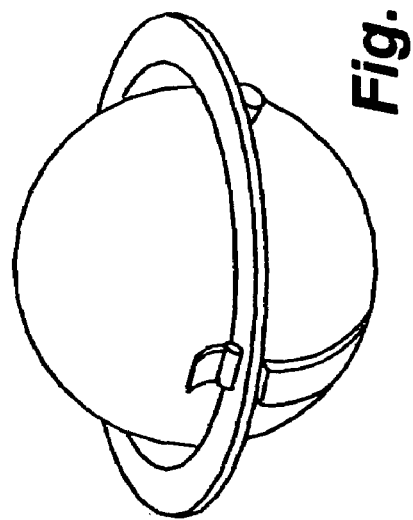
FIG. 14 out
Figure 15:
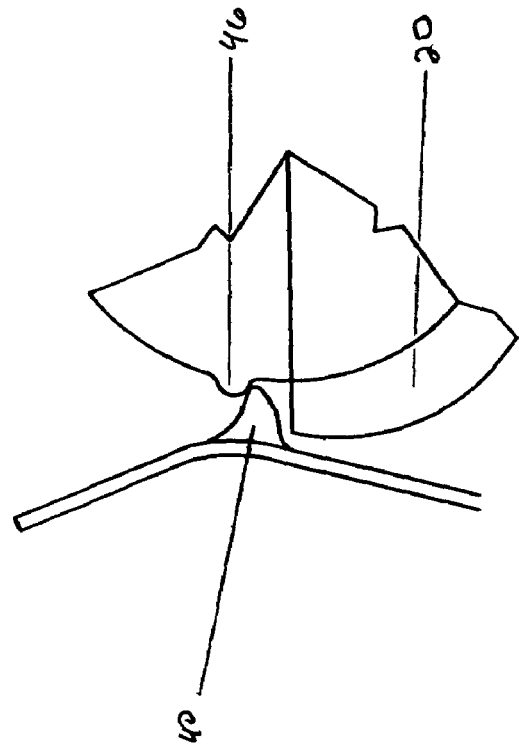
FIG. 15 is a zoom view of the latch release mechanism of FIG. 12.
Figure 12:
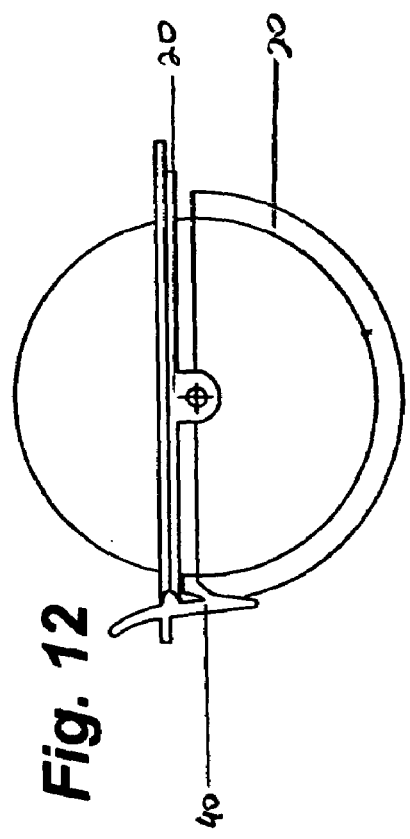
FIG. 12 is a side view of the infuser mechanism utilizing a latch release mechanism.
Figure 13:
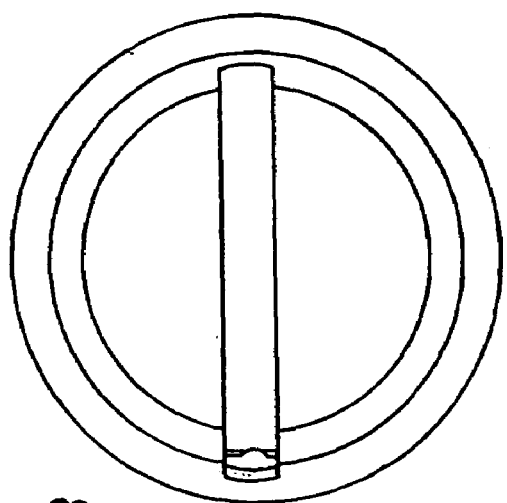
FIG. 13 is a top view of the invention of FIG. 12.

Referring now to FIGS. 5–6, these drawings show and an additional infuser mechanism embodiment and an additional release mechanism embodiment. In this release mechanism embodiment the actuator 32 operatively connects the timer mechanism and the latch mechanism. A pivot point 38 cooperates with the actuator 32 such that as the timer mechanism finishes, it supplies a downward force to End A 48. The actuator 32 is constrained at the pivot point and the downward force is translated into an outward force at End B 50. The outward force exerted upon the latch by the actuator 32 then aids in opening the latch and allows the infuser mechanism 24 to rotate to its natural position.

In practice, as shown in FIGS. 5a and 6, this release mechanism embodiment may be coupled with an infuser mechanism that includes a filter element 26 and a float 52. The infuser mechanism 24 is rotatably connected to the teapot 20 such that it may rotate around an axis 25. The latch 40 and latch couple 46 cooperate to hold the filter element 26 in the downward position. The actuator 32 operatively connects the timer mechanism 36 with the latch 40 and for best results is positioned such that end A 48 is adapted to receive a downward force from the timing mechanism while end B 50 is adapted to provide an outward force upon the latch 40. The downward force may be accomplished by for example a button being released from the timing mechanism 36, however any conventional means may be utilized and is considered within the scope of this invention. The actuator 32 should be constructed from a rigid material such that when the downward force is applied at end A 48, the actuator 32 will not flex around the pivot point 38 and such will translate the downward force at end A 48 into an outward force at end B 50. The outward force would then open the latch 40 and release the infuser mechanism 24 and allow the infuser mechanism to rotate to its natural position with the filter element out of the water. The timer mechanism in this embodiment may utilize a release button timer mechanism. In practice, once the timer has finished, a button is released that conventionally struck a bell, or in this embodiment applies a force to one end of the actuator.

An additional embodiment of the infuser mechanism is reflected in FIGS. 9–14. These drawings show an additional embodiment of the invention, which includes an infusion mechanism comprised of a filter element 26 and a torsion spring 52. In this embodiment, the torsion spring 52 is operatively connected between the teapot housing and the filter element 26 such that the filter element is rotatably fixed around an axis 25. If left unsupported, the infuser mechanism would rotate around the axis and the filter element would come to rest out of the water. Tea is placed within the filter element 26 and a mechanism for releasing the filter element 26 as described in the first aspect of the invention is then coupled with this embodiment to allow for the filter element 26 to be removed from the water without intervention by the user. In this embodiment, the torsion spring moment must be greater than the combined weight of the wet tea in the filter element and the weight of the filter element. In this embodiment, the torsion spring acts to force the infuser mechanism into its natural position with the filter element out of the water.

It will now be understood that what has been disclosed herein includes a new teapot that utilizes an infuser mechanism coupled with a timer and a release mechanism to automatically remove the tea from the water without intervention by the user. Those having skill in the art to which the present invention relates will now as a result of the teaching herein perceive various modifications. Accordingly, all such modifications are deemed to be within the scope of the invention that is to be limited only by the claims.

What is claimed is:

1. An infuser teapot with an automatic removal system comprised of:
   a teapot housing;
   a timing mechanism;
   an infuser mechanism that includes a filter element and a counter balance, wherein said infuser mechanism is capable of rotating between a first and second position around a horizontal axis, and wherein said filter element is in contact with the water in said first position and out of the water in said second position;
   a release mechanism operatively connected between said timing mechanism and said infuser mechanism wherein said release mechanism provides for the movement between said first and second position; and
   means to keep said filter element in said first position until said release mechanism provides for the movement between said first and second position.

2. An infuser teapot with an automatic removal system of claim 1, further comprising a detent couple and a detent wherein said detent cooperates with said detent couple to allow for said infuser mechanism to remain in said first position.

3. An infuser teapot with an automatic removal system of claim 2, wherein said release mechanism comprises an actuator operatively connected between said timing mechanism and said counterbalance and wherein when said timing mechanism has reached the designated timer, said actuator applies a force to said counterbalance overcoming the support provided by said detent.

4. An infuser teapot with an automatic removal system of claim 1, further comprising a latch, and latch couple wherein said latch and said latch couple cooperate to allow for said infuser mechanism to remain in said first position.

5. An infuser teapot with an automatic removal system of claim 4, wherein said release mechanism comprises an actuator operatively connected between said timing mechanism and said latch and said actuator is constrained at a pivot point located along said actuator and wherein said actuator receives a force from said timing mechanism, such that said latch and said latch couple no longer cooperate to allow said infuser mechanism to remain in said first position.

6. An infuser teapot with an automatic removal system of claim 3, further comprised of an actuator operatively connected between said timing mechanism and said infuser mechanism, wherein when said timing mechanism has reached the designated timer, said actuator applies a one-time force to said infuser mechanism overcoming the support provided by said detent.

7. An infuser teapot for making tea from either tea leaves or tea bags with an automatic removal system comprised of:
   a teapot housing;
   a timing mechanism;
   an infuser mechanism operatively connected to said teapot housing and wherein said infuser mechanism is rotatably fixed around an axis and capable of moving between a first and second position, and wherein if left unsupported said infuser mechanism would rotate around the axis and come to rest in said second position;
   said infuser mechanism includes a filter element and a counter balance, wherein said filter element is capable of holding either tea leaves or tea bags, and wherein said first position places said filter element and the tea leaves or tea bags contained therein in contact with the water, and said second position places the filter element and the tea leaves or tea bags out of contact with the water, and wherein said counter balance weighs more than the combined weight of said wet tea leaves or tea bags and said filter element;
   a release mechanism operatively connected between said timing mechanism and said infuser mechanism wherein said release mechanism provides for the movement between said first and second position;
   means to keep said infuser mechanism in said first position until said release mechanism provides for the movement between said first and second position.

8. An infuser teapot of claim 7, wherein said means to keep said infuser mechanism is a detent that supports said infuser mechanism such that said filter element of said infuser mechanism are in said first position.

9. An infuser teapot of claim 8, wherein said release mechanism is comprised of an actuator operatively connected between said timing mechanism and said infuser mechanism, wherein when said timing mechanism has reached the designated time, said actuator applies a force to said infuser mechanism overcoming the support provided by said detent.

10. An infuser teapot of claim 7, wherein said means to keep said infuser mechanism in said first position is a latch.

11. An infuser teapot of claim 10, wherein said release mechanism is an actuator operatively connected between said timer mechanism and said latch, wherein when said timing mechanism has reached the designated time, said timing mechanism applies a force to said actuator overcoming the support provided by said latch.

12. An infuser teapot of claim 10, wherein said latch is constrained at a pivot point.

13. An infuser teapot of claim 7 wherein said counter balance is a torsion spring, and wherein the moment of said torsion spring is greater than the combined weight of the wet tea leaves or wet tea bags and said filter element.

14. An infuser teapot of claim 7 wherein said counter balance is a flotation device and wherein the moment of said floatation device is greater than the combined weight of wet tea leaves or wet tea bags and the filter element.

* * * * *